Patented May 12, 1931

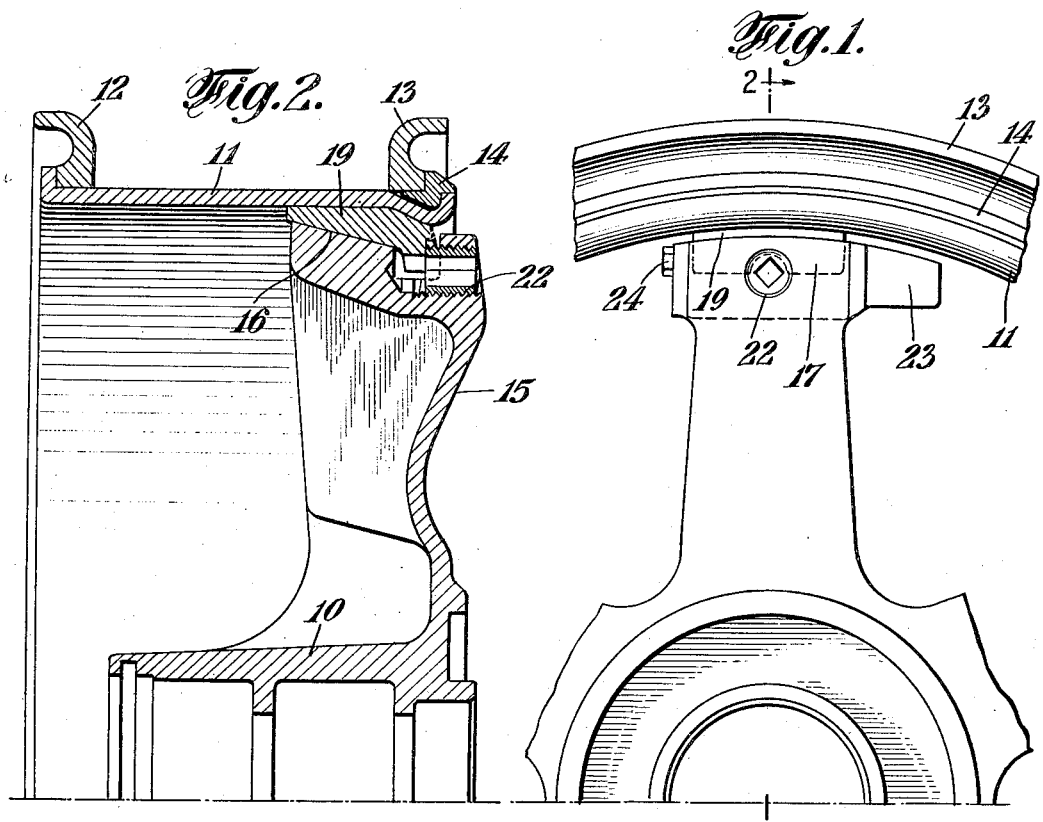
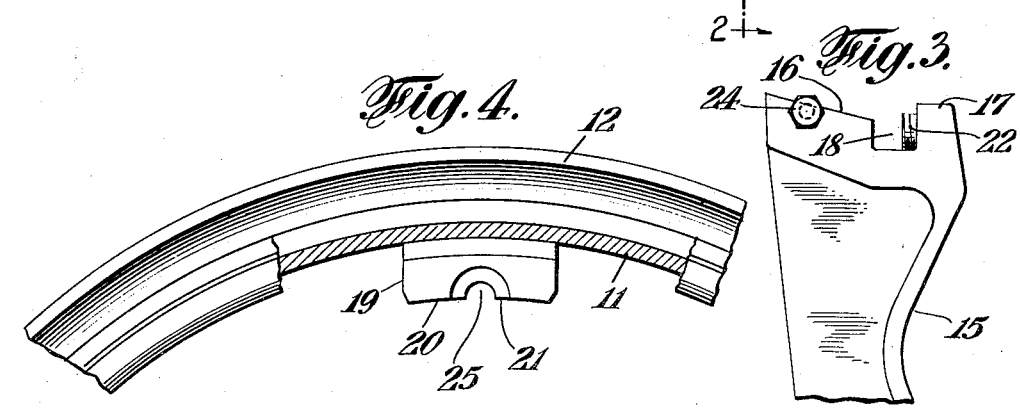
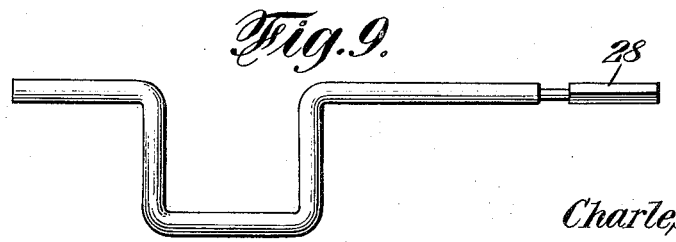

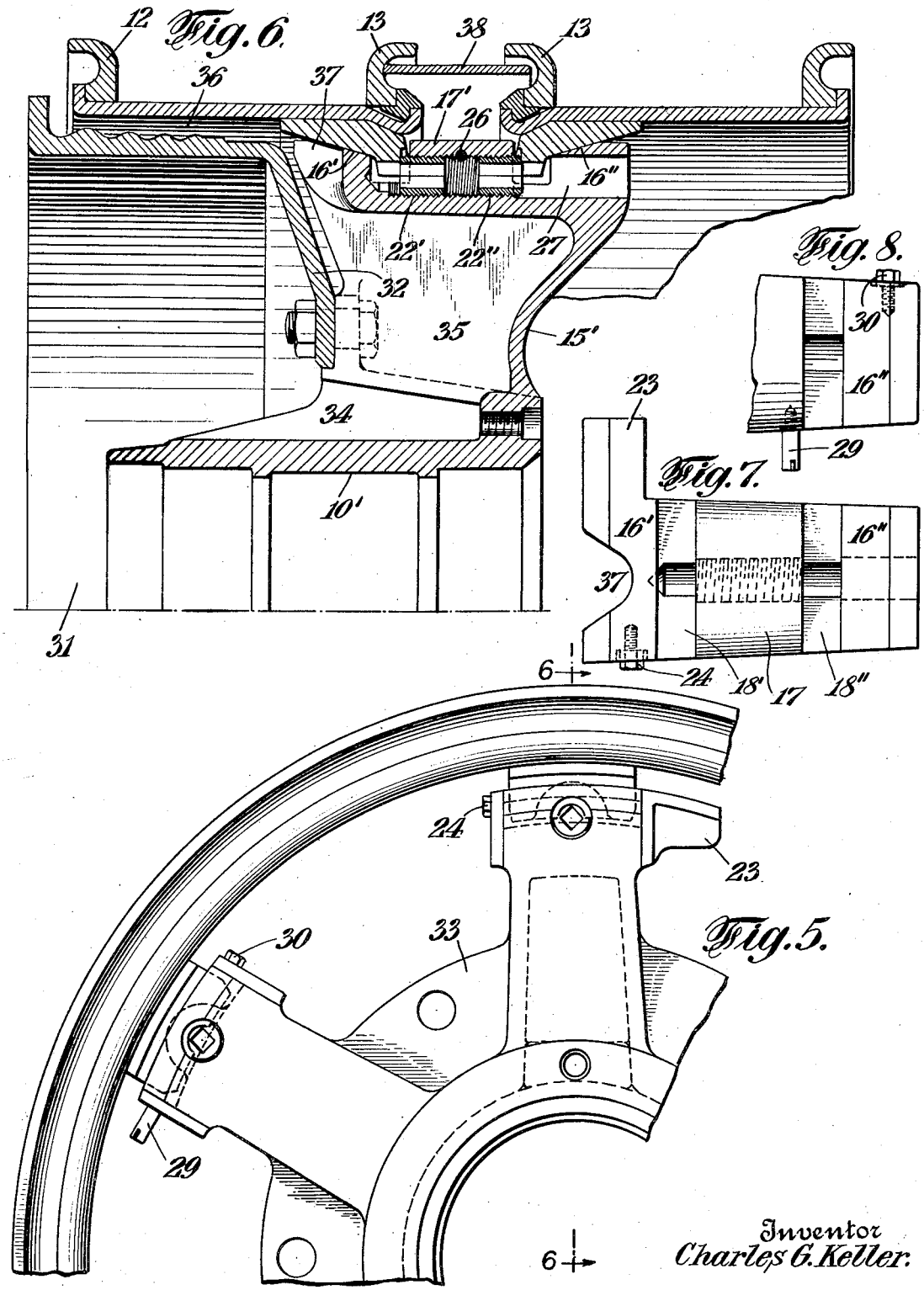

1,804,937

UNITED STATES PATENT OFFICE

CHARLES G. KELLER, OF POUGHKEEPSIE, NEW YORK

VEHICLE WHEEL

Application filed August 21, 1926. Serial No. 130,569.

This invention is an improvement in vehicle wheels and relates particularly to the means employed for detachably securing the tire carrying rim in position.

One object of the invention is to provide a simple, inexpensive and effective securing means in which there are no loose attaching parts which are removed, and which are liable to be misplaced when changing rims.

A further object of my invention is to provide the rim with attaching lugs which are small in size, and therefore light in weight, and which may be manufactured without the necessity of any drilling or other machine finishing operations.

A further object is to provide a simple form of attaching means for twin tire wheels, the attaching means including separate bolts for the two rims positioned in alignment with each other and readily operated from the outer side of the wheel.

Other objects and advantages will be pointed out hereinafter, or will be apparent from a consideration of the specific embodiments illustrated in the accompanying drawings and hereinafter described.

In these drawings:

Fig. 1 is a face view of a portion of a wheel embodying my invention looking in the direction of the axis of the wheel and showing one spoke with a portion of the rim.

Fig. 2 is a section on the line 2—2 of Fig. 1.

Fig. 3 is an edge view of the outer end of one of the spokes looking circumferentially of the wheel.

Fig. 4 is an edge view of a portion of the rim broken away to show the attaching lug.

Fig. 5 is a view of a portion of a wheel designed for twin tires, looking in the direction of the axis of the wheel.

Fig. 6 is a section on the line 6—6 of Fig. 5, and showing a brake drum which has been omitted from Fig. 5.

Fig. 7 is a view of one of the spokes of the wheel shown in Figs. 5 and 6 looking radially of the wheel.

Fig. 8 is a similar view of a portion of another spoke of the same wheel, and

Fig. 9 is a side elevation of a tool which may be employed for releasing or tightening the rim securing means.

In the construction shown in Figs. 1 and 2, there is provided a suitable construction of wheel hub 10 adapted to be secured in any suitable manner to the vehicle axle. There is also provided a rim which may likewise be of known construction. The rim illustrated is of the type commonly known as a Firestone rim, and includes a web portion 11 and a pair of flanges 12 and 13, the flange 13 being removable and normally locked in place, by a split ring 14. I do not wish to be limited to the details of this rim, as it forms no portion of my invention and may be replaced by other types of rims adapted to carry either pneumatic or solid tires.

In my improved construction the hub 10 is provided with a plurality of spokes 15 which are preferably cast integral with the hub, and which are free at their outer ends. That is, the wheel does not have any felly and is of spider form with separate radiating spokes carried by the hub. Each spoke at its outer end presents a surface 16 which is inclined in an axial direction. The spoke also presents a lug 17 spaced from the lower or inner end of the inclined surface so as to leave a recess 18 therebetween. The rim is provided with a plurality of lugs 19 corresponding in number to the number of spokes. Preferably each lug extends circumferentially of the rim through a distance approximately equal to the width of the outer end of the corresponding spoke and has its inner surface inclined axially at the same angle as the surface 16, and adapted to engage with the latter. Each lug 19 preferably has an inwardly projecting portion 20 at the inner end of the inclined surface thereof, and is adapted to enter the recess 18. The outer surface of this portion 20 preferably has a countersunk recess 21 adapted to receive the end of a clamping bolt 22 carried by the lug 17 of the spoke and extending axially. With the rim in position, as shown in Fig. 2, the tightening of the clamping bolt 22 forces the rim lug 19 axially along the inclined surface 16, so as to effectively clamp the rim in position on the wheel. The clamping bolt 22 by entering the countersunk recess 21, serves to lock the rim against any circumferential or creeping movement in case the bolt is not tightened sufficiently to cause the clamping action on the incline surface to accomplish this result.

In placing the rim in position on the wheel, it is first held in a position axially displaced from the hub and spokes and with the lugs 19 disposed between adjacent spokes. The rim is then moved axially to the proper distance and then is rotated to bring the lugs into registry with the ends of the spokes and to bring the projecting portion 20 into the recess 18 with the countersunk recesses 21 opposite the clamping bolt 22. To facilitate this positioning of the rim, one or more of the spokes may be provided with a lug 23 which serves as a stop to limit the axial movement of the rim. Also, one or more of the spokes may be provided with a stop for limiting the circumferential movement of the rim after it has been moved axially to the proper distance. As shown, one of the spokes has a screw bolt 24 extending into one side thereof, and with its head projecting slightly above the inclined surface 16, as shown particularly in Fig. 3.

By means of my improved construction the lugs are of the minimum size and weight, and do not require to be drilled or machined in any way. They may be simple drop forgings directly welded to the rim. In some cases the lugs might be formed integral with the rim. I have shown a notch or recess 25 in the inner end of the lug, 19, but this is not at all necessary where the wheel has a single tire, as shown in Figs. 1 and 2. It is particularly desirable for wheels with twin tires as hereinafter described. I have also shown the clamping bolt 22 as hollow with a non-circular passage therethrough adapted to receive a suitable key for tightening or loosening it. This might be replaced by an ordinary screw bolt with an outer head which may be engaged by a wrench or other tool, but by making the screw bolt hollow, as shown, the weight is reduced and there are no parts which project outwardly beyond the surface of the spoke.

In Figs. 5 and 6 I have shown a form of construction which may be employed for twin tires. The hub 10' has spokes 15' each with two separate and oppositely inclined surfaces 16' and 16''. The spoke has a central lug 17' which is spaced from the two surfaces 16' and 16'' by two recesses 18' and 18'' which receive the lugs of the rims. The lug 17' has two separate clamping bolts 22' and 22'' which may be moved in opposite directions to engage the two rim lugs and clamp the two rims in place. Intermediate of the ends of the threaded bore or the two clamping bolts there is preferably provided a stop 26 which prevent either bolt from being moved to a position where it interferes with the loosening of the other. The spoke end is provided with a passage 27 through which a suitable tool may be inserted for tightening or loosening either of the two clamping bolts 22' and 22''. I may employ such a tool as that shown in Fig. 9, which is of the bit-stock type, with an end portion or key 28 which may be slipped through the passage in the clamping bolt 22'' and used for turning the clamping bolt 22', or may be inserted to a lesser distance and operate only on the bolt 22''.

The key or end portion is of such length that the tool may freely rotate in the clamping bolt 22'' when in operative engagement with the clamping bolt 22'.

To facilitate the proper spacing of the rims, certain of the spokes are provided with circumferentially extending lugs 23 adjacent to the surface 16' for limiting the endwise movement of the inner rim, and a stop 24 is provided for limiting the rotational movement of the same rim. One or more other spokes are provided with means for facilitating the positioning of the outer rim.

In Fig. 8 I have shown the end of one such spoke provided with a stop lug 29 at one side for limiting axial movement, and a stop 30 on the other side for limiting the rotational movement.

The spokes are preferably U-shape in cross-section so as to form channels extending lengthwise of the spokes, and these channels serve for air currents induced by centrifugal action during the rotation of the wheel. The wheel shown in Fig. 6 is provided with a brake drum 31 which has an end wall or inwardly directed flange 32 which is bolted to a web 33 connecting the spokes. The brake drum is spaced from the inner rim so that air may enter each spoke at an inlet port 34 adjacent to the hub, and may flow through the passage 35 in the spoke to the passage 36 between the rim and the brake drum. A portion of the outer end of the spoke may be cut away or formed with a recess 37 to facilitate the flow of air from the spoke to the passage 36. Thus during the rotation of the wheel the spokes act as fan blades or as a centrifugal pump impellor which forces the air out and along the brake drum to cool the latter. For preventing air currents between the spokes from passing out between the two tires there is preferably provided an annular baffle between the two rims. This is shown as a collar 38 carried by the flange 13 of one of the rims, and extending into the groove of the flange 13 of the other rim. It may be welded to one rim or may be provided with suitable fastening devices for holding it in place. Although the invention herein claimed involves only the mechanism or parts serving to detachably secure the rim or rims in position, the accompanying drawings and the structures above described involve various other important features of my invention which are claimed in copending application Ser. No. 154,092, filed Dec. 11, 1926. This applies particularly to the construction whereby the parts are cooled by air currents delivered radially through the passages in the spokes, a portion of such air being diverted axially between the inner rim and the brake drum.

Having thus described my invention, what I claim as new and desire to secure by Letters Patent is:

1. A vehicle wheel having a plurality of spokes each presenting at its outer end an outwardly facing surface inclined at an angle to the axis of the wheel, and an outwardly extending lug at the inner end of said surface, a rim having a plurality of lugs each presenting an inwardly facing inclined surface adapted to register with the inclined surface of a corresponding spoke, and clamping bolts each carried by and having threaded engagement with one of said first mentioned lugs and adapted to engage with one of said second mentioned lugs to force the rim axially and firmly engage the opposed inclined surfaces.

2. A construction as defined in claim 1, in which one or more of the second mentioned lugs is provided with a recess in the outer end thereof adapted to receive the end of the clamping bolt to prevent the rim from creeping.

3. A construction as defined in claim 1, in which the spokes have recesses between the inclined surfaces, and the lugs thereof, to receive inwardly projecting portions on the lugs of the rims.

4. A device constructed as defined in claim 1, in which one or more of the spokes is provided with means for limiting the axial movement of the rim to the desired position to facilitate rotation of the rim into final position.

5. A construction as defined in claim 1, in which one or more of the spokes is provided with a stop to limit the rotational movement of the rim into position with the lug of the rim properly registering with the clamping bolt.

6. A construction as defined in claim 1, in which one of the spokes is provided at its side with a lug adapted to engage the rim lug when the rim is moved axially with its lugs between adjacent spokes.

7. A construction as defined in claim 1, in which one of the spokes is provided with a projection at one edge of the inclined surface thereof to engage the lug of the rim and limit rotational movement of the rim.

8. A vehicle wheel having a plurality of spokes each having its outer surface presenting a centrally disposed outwardly extending lug and a pair of opposed inwardly converging surfaces, a pair of rims having inclined surface portions adapted to engage with the converging surfaces of the spokes, and means carried by said lug and movable laterally with respect thereto for forcing said rims in opposite directions to secure them in position on said converging surfaces.

9. A vehicle wheel having a plurality of spokes each having its outer surface presenting a centrally disposed outwardly extending lug and a pair of opposed inwardly converging surfaces, a pair of rims having inclined surface portions adapted to engage with the converging surfaces of the spokes, and a pair of oppositely threaded clamping bolts carried by said lug in alignment with each other and adapted to be moved in opposite directions to force said rims into locking engagement with said converging surfaces, one of said bolts having an axial passage therethrough, whereby the other bolt in alignment therewith may be operated by the insertion of a suitable tool through the first mentioned bolt.

10. A vehicle wheel having outwardly facing surfaces spaced apart and inclined in opposite directions, each at an angle to the axis of the wheel, a pair of rims having inclined surfaces for seating on the first mentioned surfaces respectively, and a pair of oppositely acting aligned screw bolts carried by said wheel between said first mentioned surfaces for engaging said rims and forcing them apart axially in seating position, one of said bolts being of tubular form, whereby a tool may be inserted therethrough for operating the other bolt of the pair.

11. A vehicle wheel having outwardly facing relatively fixed surfaces spaced apart and inclined in opposite directions, each at an angle to the axis of the wheel, a pair of rims having inclined surfaces for seating on the first mentioned surfaces respectively, a centrally disposed projection on said wheel, and means carried thereby between said first mentioned surfaces and movable laterally with respect thereto for engaging said rims and forcing them apart axially to seating position.

12. A vehicle wheel having rim supporting surfaces spaced apart and inclined inwardly in opposite directions at an angle to the axis of the wheel, a pair of rims, each having a single row of lugs, the lugs on the outboard rim being at the inboard edge thereof, and the lugs on the inboard rim being at the outboard edge thereof, said lugs presenting inwardly facing inclined surfaces for seating on the first mentioned surfaces respectively, and means carried by said wheel between said first mentioned surfaces for engaging said lugs to force said rims apart axially to seating position.

13. A wheel having a peripherally facing inclined surface and an outwardly projecting part spaced from the inner end thereof, a rim having a lug presenting an inwardly facing inclined surface and an inwardly projecting part at the inner end thereof whereby the rim may be brought into position on the wheel by moving the rim axially to bring the second mentioned part past the first mentioned part and then moving the rim circumferentially to bring the second mentioned part into the rear of the first mentioned part, and means engaging said part on said rim for forcing it axially away from said part on said wheel to thereby firmly seat said second mentioned inclined surface on said first mentioned inclined surface.

14. A vehicle wheel having an outwardly facing surface inclined at an angle to the axis of the wheel, and an outwardly extending lug at the inner end of said surface, a rim having a lug presenting an inwardly facing inclined surface adapted to register with the inclined surface of the wheel, and a clamping bolt carried by and having threaded engagement with said first mentioned lug and adapted to engage with said second mentioned lug to force the rim axially and firmly engage the opposed inclined surfaces.

15. A vehicle wheel having a pair of rim supporting surfaces spaced apart and inclined inwardly in opposite directions, a pair of rims, each having a single row of lugs, the lugs on the outboard rim being at the inboard edge thereof, and the lugs on the inboard rim being at the outboard edge thereof, said lugs presenting surfaces for seating on the first mentioned surfaces, and a pair of members carried by said wheel between said first mentioned surfaces for directly engaging said lugs to force them apart axially to seating position.

Signed at New York, in the county of New York and State of New York, this 20th day of August, A. D. 1926.

CHARLES G. KELLER.